United States Patent [19]

Hwang et al.

[11] Patent Number: 4,887,306
[45] Date of Patent: Dec. 12, 1989

[54] ADAPTIVE TEMPORAL FILTER FOR ULTRASOUND IMAGING SYSTEM

[75] Inventors: Juin-Jet Hwang, Redmond; William A. Hurt, Issaquah; Ronald E. Daigle, Redmond, all of Wash.

[73] Assignee: Advanced Technology Laboratories, Inc., Bothell, Wash.

[21] Appl. No.: 116,727

[22] Filed: Nov. 4, 1987

[51] Int. Cl.$^4$ .................................................. G06K 9/44
[52] U.S. Cl. ...................................... 382/54; 358/166; 364/724.17; 364/724.19
[58] Field of Search ................... 358/166; 364/724.17, 364/724.19; 382/54

[56] References Cited

U.S. PATENT DOCUMENTS

| | | | |
|---|---|---|---|
| 3,889,108 | 6/1975 | Cantrell | 364/724.19 |
| 4,038,536 | 7/1977 | Feintuch | 364/724.19 |
| 4,305,133 | 12/1981 | Amada et al. | 364/724.17 |
| 4,408,228 | 10/1983 | Mahony | 73/620 |
| 4,694,342 | 9/1987 | Klees | 382/54 |
| 4,761,819 | 8/1988 | Denison et al. | 382/54 |
| 4,771,470 | 9/1988 | Geiser et al. | 382/27 |

Primary Examiner—David K. Moore
Assistant Examiner—Yon Jung
Attorney, Agent, or Firm—Christensen, O'Connor, Johnson & Kindness

[57] ABSTRACT

An improved temporal compounding technique for a medical ultrasound imaging system. The imaging system produces a plurality of pixel signals, such that each pixel signal comprises a time series of pixel values X(k), each pixel value being a function of the magnitude of the echo received from a particular sample volume. Each pixel signal is filtered to produce a filtered signal comprising a time series of filtered values Y(k). For each pixel signal, the characteristic of the filter varies as the magnitude of the pixel signal varies. In one embodiment, each filtered value Y(k) is equal to $A \cdot X(k) + (1-A) \cdot Y(k-1)$, with A being a monotonically increasing function of X(k). Embodiments are also disclosed in which the filter characteristic is a function of the absolute value of the difference between X(k) and Y(k−1).

22 Claims, 8 Drawing Sheets

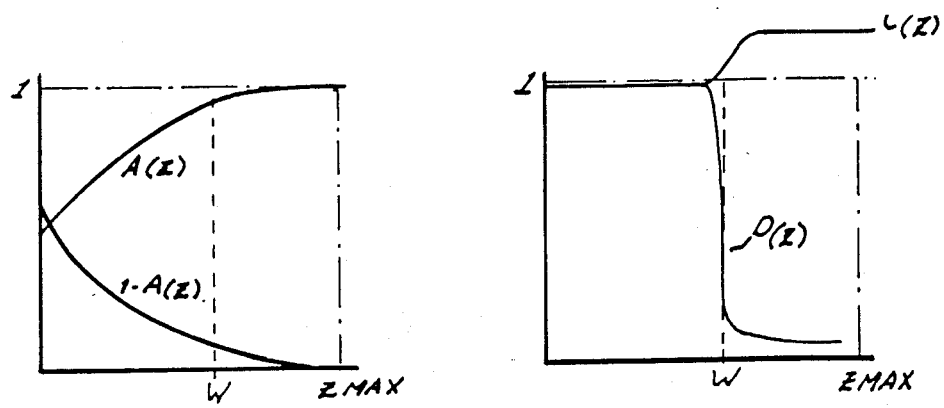
Fig. 11a.
Fig. 11b.
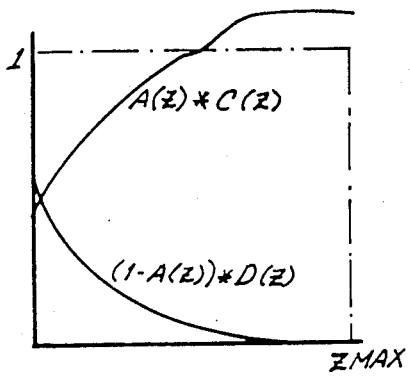
Fig. 11c.
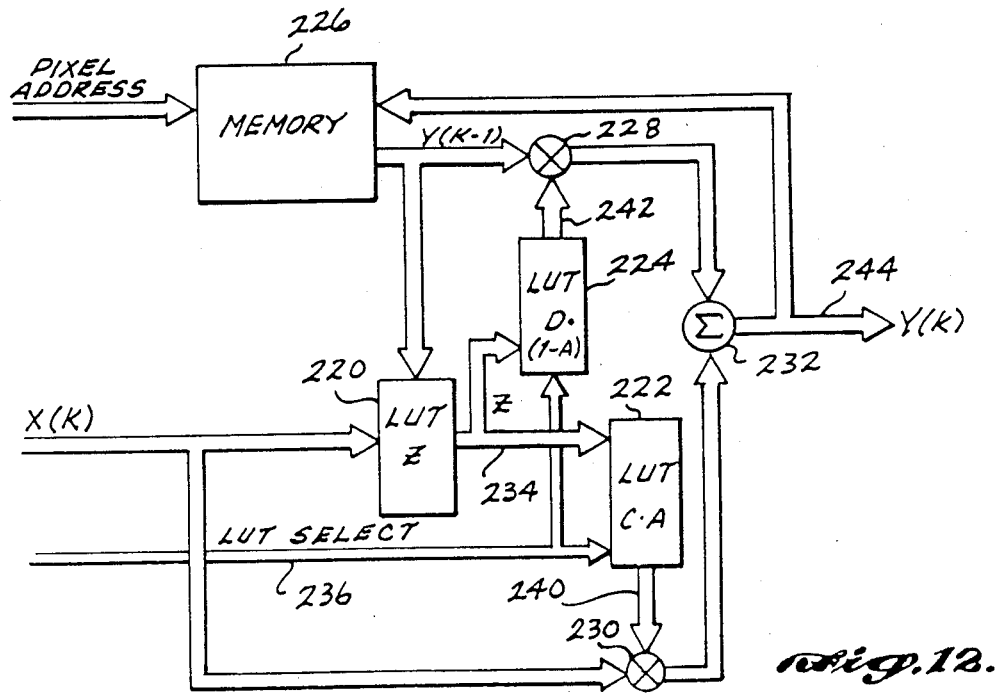
Fig. 12.

ns in the temporal domain will reduce the speckle noise. An advantage of temporal compounding over spatial or frequency compounding is that temporal compounding is relatively simple and inexpensive to implement. In addition, it involves little or no loss of spatial resolution. However, temporal compounding generally requires a direct trade-off between improvement in contrast resolution and loss of temporal resolution.

ADAPTIVE TEMPORAL FILTER FOR ULTRASOUND IMAGING SYSTEM

FIELD OF THE INVENTION

The present invention relates to medical ultrasound imaging systems that produce two-dimensional images of a subject and, in particular, to an adaptive temporal filter for filtering such images on a pixel-by-pixel basis.

BACKGROUND OF THE INVENTION

A factor which currently limits the contrast resolution of diagnostic ultrasonic imaging systems is the phenomenon of coherent speckle. The formation of speckle is due to interference effects arising from phase variations of the signals accumulated during the imaging process. These phase variations may be caused by diffuse scatterers in the object field, by multiple scattering, by an inhomogeneous propagation medium which distorts the phase of the received wave, or by phase aberation of the imaging system.

Although deterministic, speckle appears as random noise superimposed on the image, and degrades the apparent contrast resolution of the image. It is known that the speckle pattern of an image changes with displacement or rotation of the imaging aperture relative to the subject being imaged. The speckle pattern at a location in a subject also changes as the scattering structure surrounding the location changes. One common approach to reducing speckle involves combining or averaging multiple images having uncorrelated (or partially uncorrelated) speckle patterns, a technique known as "compounding." in general, compounding can be carried out in the spatial, frequency or time domains.

For spatial compounding, the imaging aperture can be divided into a number of subapertures, and signals from the subapertures are averaged. To satisfy the requirement that speckle patterns be uncorrelated, the translation of the subapertures must be more than half size of the subapertures. A disadvantage of spatial compounding is the concomitant reduction of spatial resolution caused by partitioning of the finite imaging aperture. A further disadvantage is that if the loss of temporal resolution cannot be tolerated, then parallel subaperture beam-forming is required, an approach that increases system cost.

Frequency compounding can be accomplished by dividing the bandwidth of the imaging system into multiple nonoverlapped (or partially overlapped) bands. Signals from the different frequency bands are then processed and averaged. A disadvantage of frequency compounding is that the narrow band processing results in loss of both lateral and axial resolution. The well-known frequency dependent attenuation properties of body tissues also limits the effectiveness of frequency compounding at large depths. A further problem is that temporal resolution is degraded, since multiple transmit pulses corresponding to the different frequency bands must be used.

Temporal compounding involves averaging successive frames with one another. Due to the fact that most live tissues move, either actively as part of their function, or passively in response to the respiratory, cardiovascular or gastric movements of nearby organs and blood vessels, the geometrical distribution of scattering structures surrounding an imaging point continually change with time. As a result, speckle patterns in the image also change continually. Thus, compounding images in the temporal domain will reduce the speckle noise. An advantage of temporal compounding over spatial or frequency compounding is that temporal compounding is relatively simple and inexpensive to implement. In addition, it involves little or no loss of spatial resolution. However, temporal compounding generally requires a direct trade-off between improvement in contrast resolution and loss of temporal resolution.

SUMMARY OF THE INVENTION

The present invention provides a technique for temporal compounding or frame averaging that produces improved contrast resolution and/or improved motion enhancement without significant loss of temporal resolution. This result is achieved by the use of adaptive temporal filtering in which, for each pixel, the degree of filtering depends upon the magnitude of the signal corresponding to that pixel. The filter may be implemented such that it is programmable, so that an operator of the ultrasound imaging system can vary the filter characteristics to optimize the system performance for a particular application.

The present invention operates in a medical ultrasound imaging system of the type that produces a two-dimensional image of a subject. The imaging system includes means for producing a plurality of pixel signals, such that each pixel signal comprises a time series of pixel values $X(k)$. Each pixel value is a function of the magnitude of the echo received from a particular sample volume in the subject. The improvement to which the invention is directed comprises adaptive temporal filter means for filtering each pixel signal to produce a filtered signal comprising a time series of filtered values $Y(k)$. For each pixel signal, the characteristics of the filter means varies as the magnitude of that pixel signal varies. For example, the filter preferably has a low pass characteristic in which the cutoff frequency increases as the magnitude of the pixel signal increases. In one preferred embodiment, each filtered value $Y(k)$ is computed as a sum of the present pixel value $X(k)$ times coefficient P plus the prior filtered value $Y(k-1)$ times coefficient Q, at last one of coefficients P and Q being a function of $Y(k-1)$. Coefficient Q may be equal to the product $B \cdot (1-A)$, where B is a monotonically decreasing function of $Y(k-1)$ and A is a function only of $X(k)$, with P equal to $1-Q$.

A principle concept underlying the present invention is that speckle contamination is usually more of a problem when imaging diffuse scatterers. A property of echoes from diffuse scatterers is that they are usually low in intensity, because the scattering cross section of each scatterer is small, and the phases of signals from each scatterer in the resolution cell are random. Examples of diffuse scatterers for the case of clinical ultrasound imaging are the liver parenchyma and myocardium. In comparison, high intensity ultrasonic echoes usually correspond to strong specular reflectors. These echoes mostly are either coherently resolved, or the contamination of the speckle noise component is insignificant as compared to the specularly reflected component. Examples of high intensity echoes include those from the diaphragm, cardiac valves and vessel boundaries. Temporal compounding, as practiced in the prior art, applies the same degree of compounding to both diffuse scatterers, which benefit from the frame integration, and the resolved structures, which do not. This problem is avoided in the temporal compounding technique of the present invention.

BRIEF DESCRIPTION OF THE DRAWINGS

FIGS. 11A, 11B and 11C are graphs illustrating the filter coefficients for a fourth embodiment of the filter; and FIG. 12 is a block diagram showing an implementation of the fourth example.

DETAILED DESCRIPTION OF THE INVENTION

Figure 1:
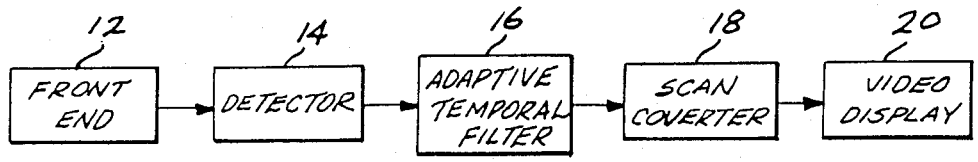
FIG. 1 is a block diagram of an ultrasound imaging system that includes an adaptive temporal filter in accordance with the present invention.

FIG. 1 illustrates a preferred embodiment of a medical ultrasound imaging system that includes an adaptive temporal filter in accordance with the present invention. The illustrated imaging system includes front end 12, detector 14, adaptive temporal filter 16, scan converter 18 and video display 20. Front end 12 performs the functions of transmitting bursts of ultrasound energy into a subject, and of receiving the resulting echoes and converting such echoes into electrical signals. In phased array imaging systems, front end 12 is often referred to as a beamformer. Detector 14 determines the magnitudes of the echo signals for each of a set of sample volumes in the planar field of view of the imaging system. For either mechanical or phased array systems, the sample volumes are arrayed along beam lines in a polar coordinate system, whereas in a linear array system the sample volumes are arrayed along a rectangular grid. The detector produces a series of echo signals that indicate the magnitude of the echo received from each sample volume in a particular time window, and then repeats the process for the next time window, etc. The set of all echo signals in a given time window is referred to as a frame, and the set of echo signals for a given sample volume over a period of time is referred to as a pixel signal.

Adaptive temporal filter 16 temporally filters each pixel signal, as described in detail below, and provides the filtered signals to scan converter 18. For sector scanning systems, scan converter 18 converts the filtered signals from polar to rectangular coordinates. For linear array systems, the scan converter is used for panning and zooming functions. In either type of system, the resulting raster-type image signals are then displayed by video display 20. Because the adaptive temporal filter 16 preferably operates independently on each pixel signal, the filter can be located at any point in the signal processing chain at which a series of discrete digital or analog samples of the pixel signals are available for processing. For example, the filter can be located either before or after the scan converter. However, the filter should in general be placed after the detector, to avoid undue sensitivity of the filter to phase relationships between successive samples of the signal.

In general, filter 16 can be utilized in either a digital or in a sampled analog system. However, the filter is easiest to implement into a digital system, and a digital system will therefore be described below. In the preferred digital implementation, each pixel signal is represented by the sequence X(k), where the index k represents time or sample number. Since the set of X(k) values for all pixel signals represents one video frame, the index k can also be regarded as a frame number. The filtered signal produced by the filter will be designated Y(k). In general, a causal discrete filter for transforming incoming inputs X(k) to outputs Y(k) can be represented by:

$$Y(k) = \sum_{i=0}^{m} c(i) X(k-i) + \sum_{i=1}^{n} d(i) Y(k-i) \tag{1}$$

where c(i) and d(i) are the filter coefficients. These coefficients fully define the "characteristic" of the filter. In its broad scope, the present invention contemplates that each pixel signal will be passed through a filter whose characteristics vary as that pixel signal varies. Thus in effect, there is a separate filter for each pixel signal. Although the present invention could be used in conjunction with spatial filtering, such that a given pixel signal was also affected by neighboring pixel signals, the preferred implementation described below treats each pixel signal independently.

In an important class of filters that may be used for the present invention, the filter for each pixel signal is a low pass filter that smoothes or averages the pixel signal X(k). As a result, the effect of operation of the filter on all pixels is to average frames with one another. However unlike prior art frame averaging techniques, the filter of the present invention is adaptive, such that the characteristics of each lowpass filter varies as the pixel signal varies. In general, the filtering operation for the frame averaging embodiments can be implemented as either an IIR or FIR filter. However, as will appear below, each term in the filter equation (other than X(k)) will require a separate, frame-size block of memory for storing either the X or Y values corresponding to one or more prior frames. Since an IIR filter requires fewer terms to produce a given degree of averaging than does an FIR filter, IIR filters are preferred. In particular, it has been found that highly satisfactory results can be achieved using an IIR filter of the following form:

$$Y(k) = P(X(k), Y(k-1)) \cdot X(k) + Q(X(k), Y(k-1)) \cdot Y(k-1) \tag{2}$$

wherein the filter contains only terms in $X(k)$ and $Y(k-1)$, and wherein the filter coefficients P and Q are functions of $X(k)$ and $Y(k-1)$. It is to be understood that Equation (2) is one of several possible forms of the filter that may be used. Other suitable and practical forms of the filter are as follows:

$$Y(k) = P \cdot X(k) + Q \cdot Y(k-1) + R \cdot Y(k-2) \tag{3}$$

$$Y(k) = P \cdot X(k) + Q \cdot X(k-1) \quad (4)$$

In Equation (3), filter coefficients P, Q and R could each be a function of the present input and the two prior outputs, whereas in Equation (4) filter coefficients P and Q could each be a function of the present input X(k) and the prior input X(k−1). However, as compared to the filter of Equation (2), the filter of Equation (3) requires additional memory, and the filter of Equation (4) is less effective. The filter of Equation (2) is therefore preferred, because it produces excellent results for a comparatively small amount of required hardware.

In a first example of the filter, the coefficients P and Q are functions only of the input pixel signal X(k). In particular:

$$P = A(X(k)) \quad (5)$$

$$Q = 1 - A \quad (6)$$

$$0 < A < = 1 \quad (7)$$

Equations (2) and (5)–(7) represent a low pass recursive filter that adapts to the magnitude of the pixel signal X(k). The function A(X(k)) is preferably a monotonically increasing function of the magnitude of the pixel signal X(k). Thus for low magnitude inputs X(k), P will be relatively small, Q will be relatively large, and a comparatively high degree of the temporal compounding will be applied to the pixel signal. On the other hand, when the pixel signal has a comparatively high magnitude, P will be relatively large, Q will be relatively small, and less temporal compounding will be applied to the pixel signal. Thus, in the frequency domain, the filter of Equations (5)–(7) is a low pass filter with a cutoff frequency that increases as the magnitude of the pixel signal increases. The degree of frame averaging therefore decreases as the magnitude of the pixel signal increases. The term monotonic should be understood to mean substantially monotonic, i.e., a monotonically increasing function of X(k) is one that exhibits an overall increasing trend as X(k) increases, regardless of whether or not there are relatively small sections in which the function decreases with increasing X(k).

Figure 2:
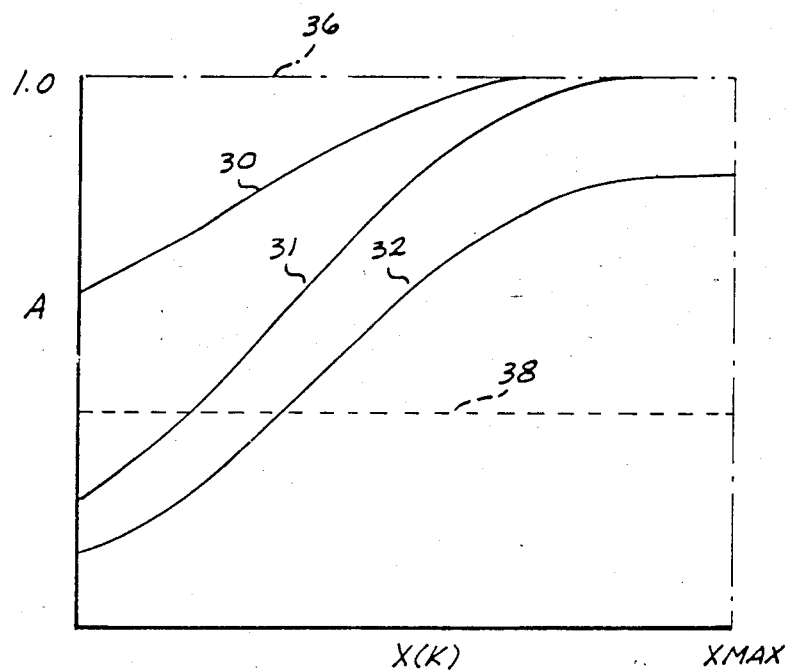
FIG. 2 is a graph that indicates the variation of the filter coefficients with pixel signal magnitude in a first example of the filter.

The relationship between the filter coefficient A and the pixel signal magnitude X(k) may be varied depending on the clinical application. FIG. 2 shows three adaptive filtering curves 30, 31 and 32, each representing different advantages in application, and two nonadaptive curves 36 and 38. In curve 36, the filter coefficient A is set to one for all values of X(k). From Equations (2) and (5)–(7), it is clear that the filtered values Y(k) are equal to X(k), and thus no filtering is performed. In curve 30, the filter coefficient A(X(k)) increases gradually with increasing X(k), and reaches a value of unity for values of X(k) near the maximum pixel signal magnitude XMAX. This produces temporal compounding that decreases with the magnitude X(k), and signals in the high magnitude region are not temporally compounded at all. The filtering characteristics of curves 30 and 31 are generally similar, except that the intercept of curve 31 to the vertical axis is lower than that of curve 30, and the slope of curve 31 in the low magnitude region is steeper than that of curve 30. These characteristics imply that more temporal compounding is applied to low magnitude data. Thus more speckle reduction is ahcieved by using curve 31 than curve 30, but the temporal resolution is more compromised.

Curve 32 represents the case in which more temporal compounding is applied to both low and high magnitude data as compared to curves 30 or 31. The filtering curve 38 is independent of the pixel signal magnitude, and represents prior art temporal compounding. As previously noted, an advantage to using curves of the format 30 through 32 is that the amount of filtering is optimized for both low magnitude slow moving diffuse scatterers, and high magnitude rapidly moving specular reflectors.

Figure 3:
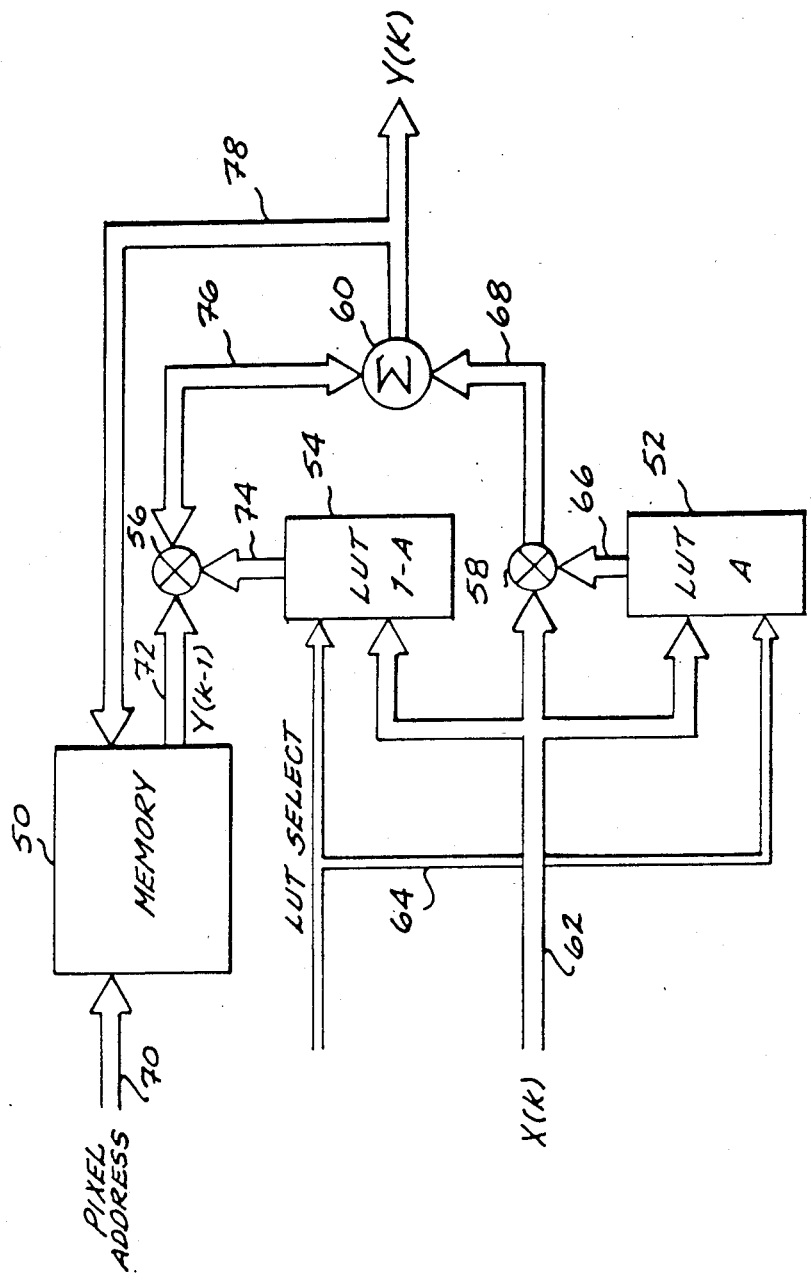
FIG. 3 is a block diagram of one implementation of the first example.

As in any digital filter, Equations (2) and (5)–(7) may be implemented by suitable combinations of memory, multipliers and summers. A first preferred implementation of this filter is shown in FIG. 3. This implementation includes memory 50, lookup tables 52 and 54, multipliers 56 and 58, and summer 60. Each pixel value X(k) is applied to lookup tables 52 and 54, and to multilier 58. Lookup table 52 provides the corresponding value of the parameter A on bus 66, in accordance with relationships such as those shown by curves 30–32 in FIG. 2. Preferably, a plurality of curves of the type shown as 30–32 are stored in each lookup table, and the particular curve to be used is indicated by a signal (LUT SELECT) provided on bus 64. Multiplier 58 places the resulting product A·X(k) on bus 68, which bus forms one of the inputs to summer 60. At the same time that value X(k) is provided on bus 62, the pixel address of value X(k) is provided to memory 50 via bus 70.

Generally, the pixel address comprises a pair of indices that indicate the horizontal and vertical positions of the corresponding pixel in the two-dimensional image produced by the system. In response to the pixel address, memory 50 provides the previous output for the addressed pixel, Y(k−1), on bus 72. Multiplier 56 multiplies the value Y(k−1) times the coefficient 1−A provided by lookup table 54 via bus 74, to produce the signal Y(k−1)·(1−A) on bus 76. The signal on bus 76 forms the other input to summer 60, and the summer adds these signals to produce the filtered signal Y(k) on bus 78. The signal on bus 78 is also returned to memory 50 for storage in the memory location formerly occupied by value Y(k−1), so that only a single location in memory 50 is required for each pixel signal. In this implementation, as well as the implementations described below, the filter may be initialized simply by setting the contents of memory 50 to 0.

Figure 4:
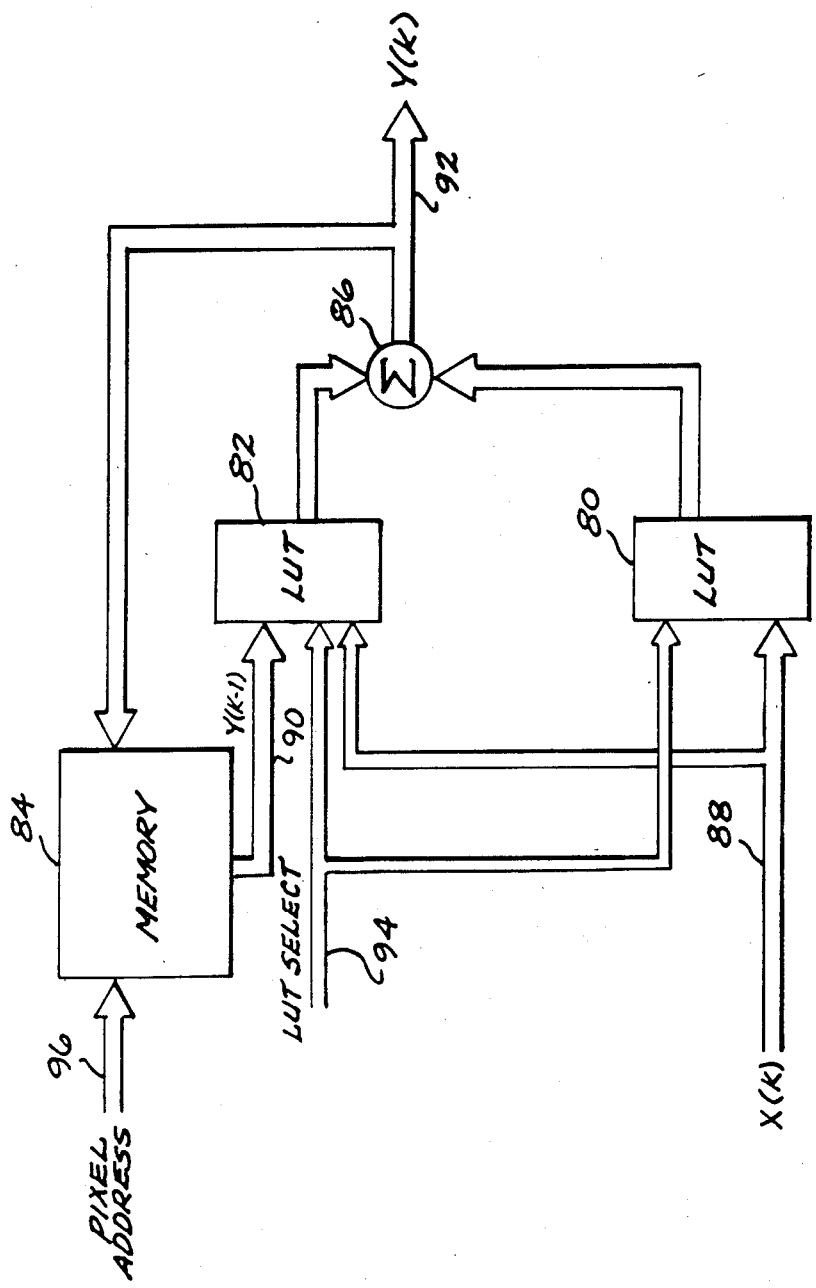
FIG. 4 is a block diagram showing a second implementation of the first example.
Figure 5:
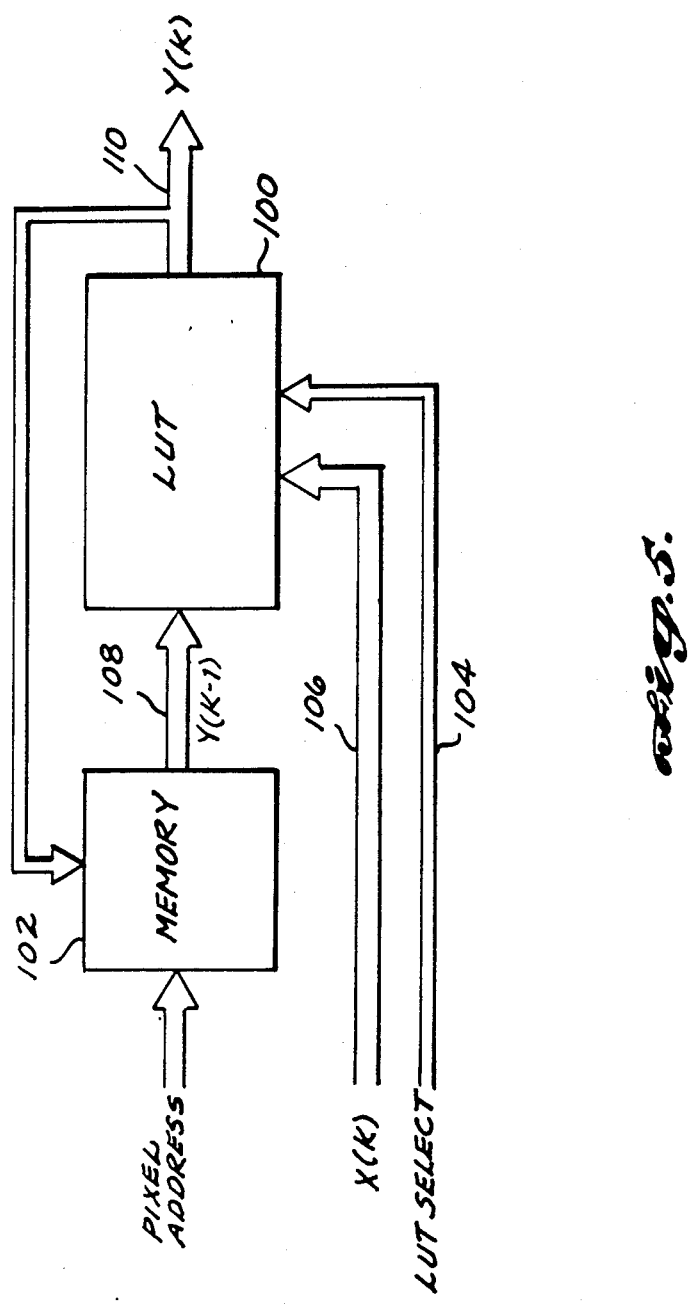
FIG. 5 is a block diagram showing a third implementation of the first example.

The multiplication and addition processes may also be implemented using lookup tables, as shown in FIGS. 4 and 5. The implementation shown in FIG. 4 includes lookup tables 80 and 82, memory 84 and summer 86. Lookup tables 80 and 82 are used to store all the possible products of A*X(k) and (1−A)*(k−1) for each filtering curve. The input pixel signal X(k) is used to address lookup tables 80 and 82 via bus 88, while the filtered data for the prior frame Y(k−1) is used to address the lookup table 82 via bus 90. The outputs of lookup tables 80 and 82 are summed in summer 86 to produce filtered data Y(k) on bus 92. Y(k) is written back in memory 84 for processing the next frame. As with the embodiment of FIG. 3, a particular filtering curve is selected by the LUT SELECT signal on bus 94, and the particular pixel signal being processed is specified by a pixel address signal on bus 96.

The implementation of FIG. 5 includes a single lookup table 100, and memory 102. Lookup table 100 stores the results of Equation (2) for all combinations of filtering curves and input and output values. The LUT SELECT signal on bus 104, the unfiltered pixel value X(k) of the kth frame on bus 106, and the filtered value Y(k−1) on bus 108 are used to address lookup table 100 to produce the filtered output data Y(k) on bus 110. Y(k) is also stored in memory 102 for the next frame processing.

Figure 6:
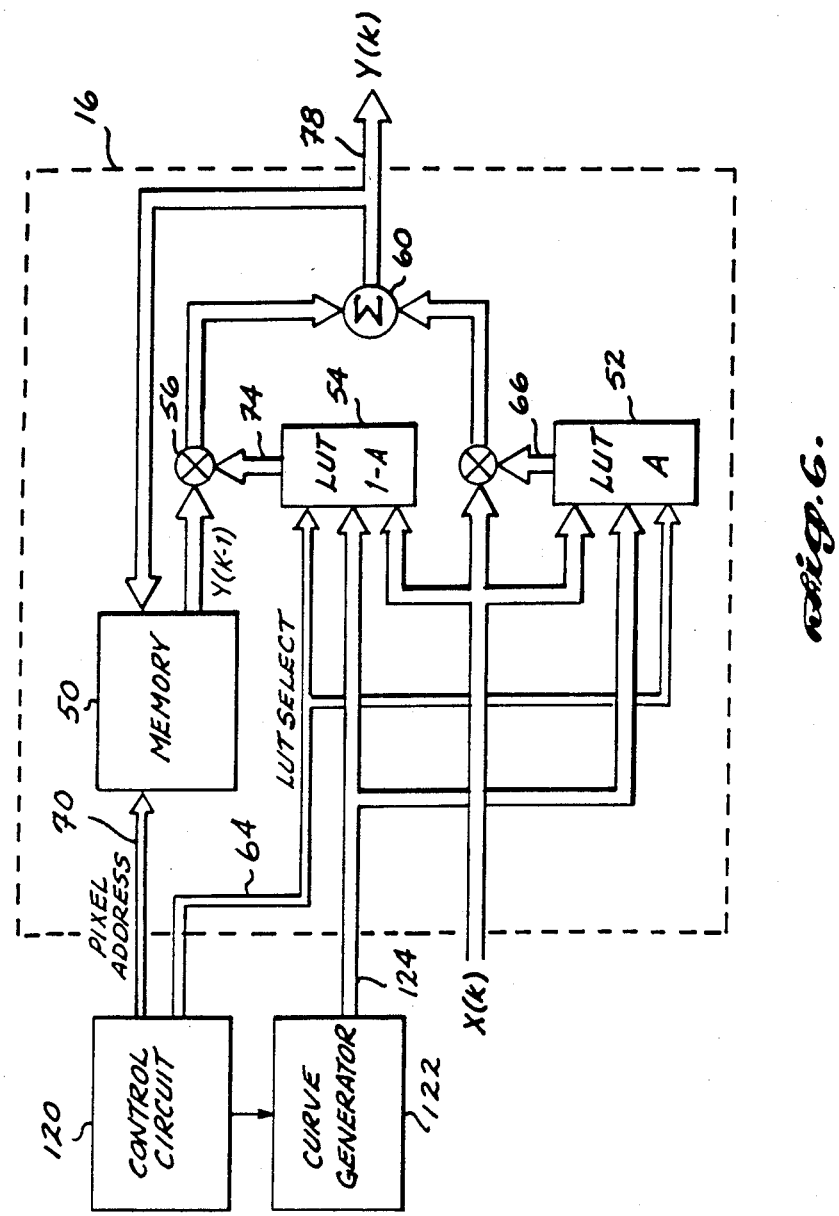
FIG. 6 is a block diagram showing a fourth implementation of the first example.

The lookup tables shown in FIGS. 3, 4 and 5 can comprise any suitable memory devices, such as PROM or RAM. A RAM based architecture allows for rapid and convenient optimization of the filter characteristic for each application. When implemented in RAM, the user may specify the filter characteristic to be loaded into the lookup tables to optimize the temporal resolution for image viewing. FIG. 6 illustrates that the filter characteristic may also be implemented in hardware, such that the user may adjust the characteristic in real time to obtain the most suitable compromises between temporal and contrast resolution. The implementation shown in FIG. 6 includes adaptive temporal filter 16, control circuit 120 and curve generator 122. The adaptive temporal filter has the same architecture as the filter shown in FIG. 3, and the like reference numerals have therefore been used for corresponding components. Control circuit 120 is used to provide the pixel address signal on bus 70 and the LUT SELECT signal on bus 64, and to provide timing signals for the summer and multipliers. Curve generator 122 is used to generate the filter characteristic (e.g., curves 30–32 shown in FIG. 2) necessary for adaptive temporal compounding. The curve generator 122 may be implemented in a manner similar to time/gaincompensation circuits used in the front end of conventional ultrasound imaging systems. In operation, the user adjusts the curve generator to obtain a set of filter characteristics to produce the best compromise between temporal resolution and contrast resolution for a particular application. Each curve is loaded into lookup tables 52 and 54 via bus 124, with suitable control and address signals being provided via either bus 64 or bus 124.

As indicated by Equations (5)–(7), the filter coefficients P and Q in the first example are each less than one. The bit-depth of memories, lookup tables, multipliers and adders that process or handle filtered data must therefore be augmented, as compared to the bit-depth of components that handle only unfiltered data, to preserve the information in the filtered signal according to the following equation:

$$A(X(k)) * [2^{}Bo] >= 2^{}Bi \qquad (8)$$

where Bi is the bit precision used for input values X(k), Bo is the bit precision for the filtered output values Y(k), with Bo being generally greater than or equal to Bi. Thus unfiltered data must first be scaled by a number of 2Bo/2Bi before the filtering processing. The scaling factor may generally be absorbed in the lookup tables in which the filter coefficients are stored.

In the example described above by Equations (2) and (5)–(7), the filter coefficients change with the magnitude of the unfiltered pixel signal. However, in a case where a high intensity pixel signal changes rapidly from frame-to-frame, for example during the imaging of heart valves in cardiology, the filtered pixel signal stored in memory for the k−1th frame Y(k−1) represents a "residue" which will contaminate the kth frame if the input pixel signal X(k) is small. The second example described below avoids this difficulty, and also demonstrates the power and versatility of the invention. In the second example, a second function B(Y(k−1)) is used to modulate the amount of filtered data in the k−1th frame to be summed with the pixel data in the kth frame, such that the contamination of low magnitude pixel values by high magnitude filtered values in the previous frame may be avoided. In particular, the filter coefficients for this second example are:

$$Q(X(k), Y(k-1)) = B(Y(k-1))' * (1 - A(x(K))' \qquad (9)$$

$$P = 1 - Q \qquad (10)$$

Figure 7A:
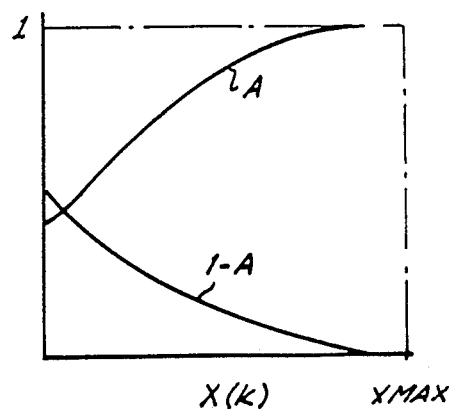
FIGS. 7A and 7B are graphs illustrating the filter coefficients for a second example of the filter.
Figure 7B:
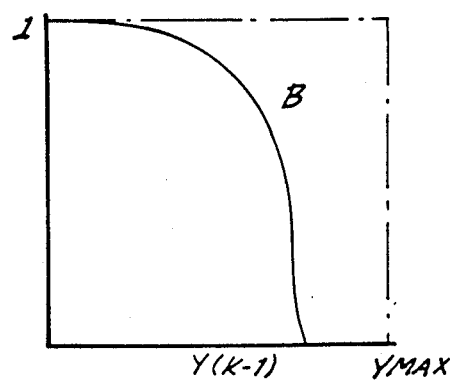

The parameter A is bounded as indicated in Equation (7), and may vary with X(k) in a manner similar to that shown by curves 30–32 in FIG. 2. Typical curves of this type showing the parameters A and 1−A are illustrated in FIG. 7A, while FIG. 7B shows a suitable curve for B(Y(k−1)). For small values of Y(k−1), the value of B is unity, and the filter of Equations (9) and (10) reduces to that of Equations (5) and (6). However as the magnitude of the filtered values Y(k−1) increases, a point is reached at which the value of B falls rapidly towards zero, thereby forcing the value of Q to decrease and the value of P to increase. This process prevents high magnitude residues Y(k−1) from contaminating the filtering process for the kth frame when the pixel signal suddenly decreases, for example when a bright, rapidly moving structure such as a valve moves out of the sample volume represented by the pixel signal.

Figure 8:
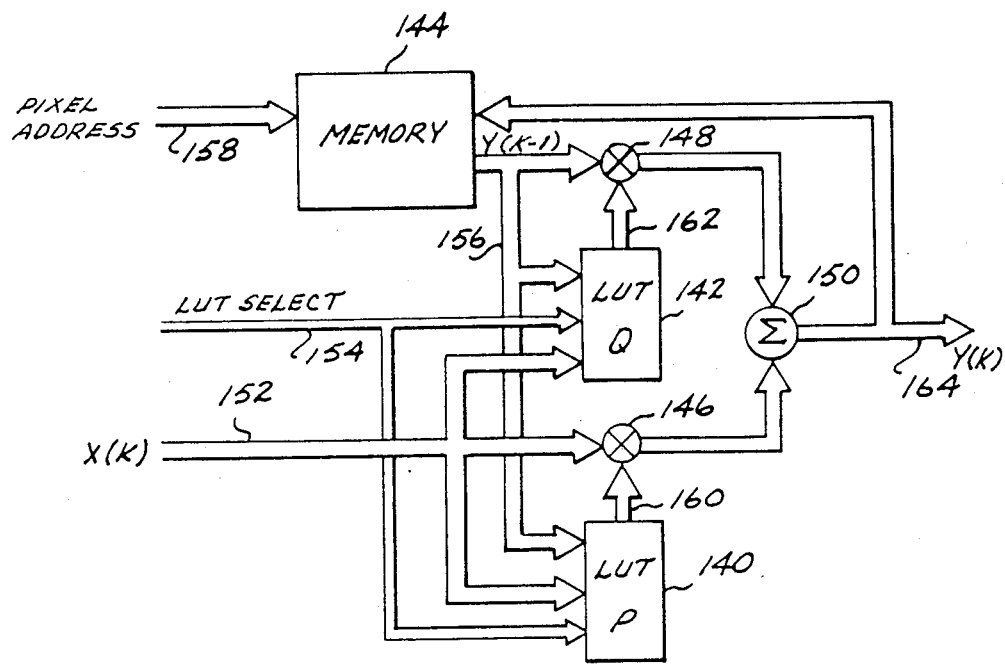
FIG. 8 is a block diagram showing an implementation of the second example.

The example of FIGS. 7A and 7B, and Equations (9) and (10), may be implemented using summers and multipliers as shown in FIG. 8. The implementation shown in FIG. 8 includes lookup tables 140 and 142 for the parameters P and Q respectively, memory 144, multipliers 146 and 148 and summer 150. This implementation is similar to that shown in FIG. 3. The pixel signal X(k) is applied to lookup tables 140 and 142 and multiplier 146 via bus 152, and the LUT SELECT signal is applied via bus 154. The filtered value Y(k−1) is produced by memory 144 on bus 156 in response to the pixel address signal on bus 158, and is applied to the lookup tables. As a result, the parameters P and Q are produced on buses 160 and 162 respectively, thereby producing output signal Y(k) on bus 164 in accordance with Equations (9) and (10). The example of Equations (9) and (10) can also be implemented in a manner generally similar to FIG. 4, in which one lookup table stores the products P·X(k), and the second lookup table stores the products Q·Y(k−1).

In a third example of the invention, a technique is provided for reducing the speckle noise while minimizing the degradation of the temporal resolution. For this example, the filter coefficients are:

$$P(X(k), Y(k-1)) = A(Z) \qquad (11)$$

$$Q(X(k), Y(k-1)) = 1 - A(Z) \qquad (12)$$

$$Z = ABS(X(k) - Y(k-1)) \qquad (13)$$

Figure 9:
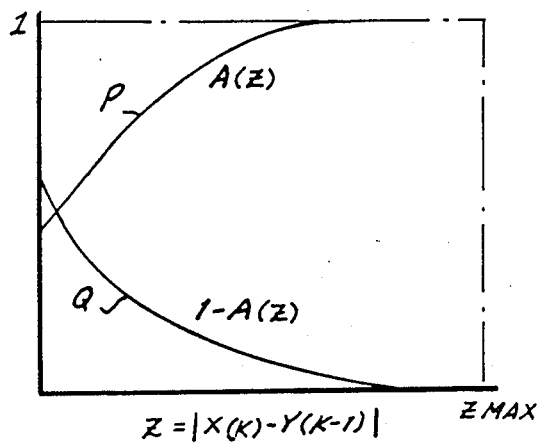
FIG. 9 is a graph illustrating the filter coefficients for a third example of the filter.

The filter coefficients P and Q are defined as a function of Z, Z being the absolute value of the difference between pixel value X(k) for the kth frame and filtered value Y(k−1) in the k−1th frame. A suitable form for the function A(Z) is shown in FIG. 9. When the difference between the pixel value X(k) for frame k and the filtered value Y(k−1) for the prior frame is small, A(Z) is comparatively small, the value of coefficient P is comparatively small, while the value of coefficient Q is comparatively large. Thus as indicated in Equation (2), a comparatively large amount of temporal compounding is performed. Thus comparatively low amplitude fluctuations in the pixel signal due to speckle noise will be temporally compounded. However when a comparatively bright structure is rapidly moving through the sample volume corresponding to the pixel signal, the pixel signal X(k) will undergo comparatively large amplitude changes, with the result that the value Z will be larger. As shown in FIG. 9, the result is that coefficient P is near unity, while coefficient Q is near zero, and little temporal compounding is performed. Thus the image of the fast moving structure will not be blurred by the temporal compounding. In the frequency domain, the filter defined by Equations (11)–(13) and FIG. 9 is a low pass filter in which the cutoff frequency increases as the rate of change of the pixel signal increases. Thus, the degree of frame averaging decreases as the rate of change of the pixel signal increases.

Figure 10:
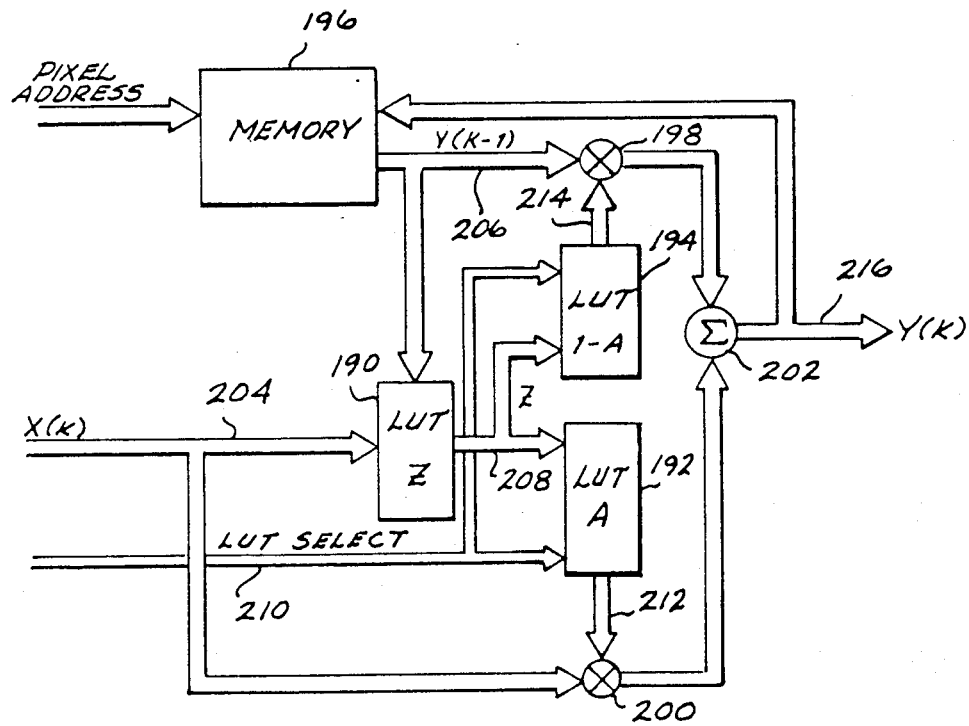
FIG. 10 is a block diagram showing an implementation of the third example.

FIG. 10 shows an implementation of the example of Equations (11)–(13). The illustrated arrangement includes lookup tables 190, 192 and 194, memory 196, multipliers 198 and 200, and summer 202. The pixel signal X(k) is applied to lookup table 190 and to multiplier 200. Lookup table 190 also receives the signal Y(k−1) from memory 196 via bus 206, and in response produces a signal representing the corresponding value Z on bus 208. The value of Z on bus 208 is input to lookup tables 192 and 194, along with the LUT SELECT signal on bus 210. Lookup tables 192 and 194 respond by producing signals representing A and 1−A on buses 212 and 214 respectively. Multipliers 198 and 200 and summer 202 respond by producing the output signal Y(k) on bus 216. Y(k) is also written into memory 196 as with prior embodiments. Also as with prior embodiments, the more general architectures shown in FIGS. 5 and 8 could also be used, and operator adjustment of the filter characteristics could be included.

A fourth example of the adaptive temporal filter is illustrated in FIGS. 11A–11C and 12. This example provides a technique for specifying the filter coefficients such that the motion of objects may be emphasized, and moving edges in the image may be enhanced. For this example, the filter coefficients are:

$$P(X(k), Y(k-1)) = C(Z)^* A(Z) \quad (14)$$

$$Q(X(k), Y(k-1)) = D(Z)^* (1 - A(Z)) \quad (15)$$

with Z being given by Equation (13). C(Z) and D(Z) serve as nonlinear gain functions used to control the amount of pixel data for the kth frame and the filtered data in the k-1th frame to be summed in the filtering process. As shown in FIGS. 11A–11C, the gain functions of the filtering process may be programmed such that when Z is larger than a given value W, the gain C is set to a value which is larger than unity, whereas D is set to a very small value. As a result of this arrangement, the images of moving structures are enhanced.

An implementation of the filter specified in Equations (14) and (15) is set forth in FIG. 12. The illustrated filter includes lookup tables 220, 222 and 224, memory 226, multipliers 228 and 230, and summer 232. As in the embodiment of FIG. 10, lookup table 220 determines the value of Z, and provides such value to lookup tables 222 and 224 via bus 234. These lookup tables also receive the LUT SELECT signal via bus 236. Lookup table 222 produces the value C(Z)·A(Z) on bus 240, and lookup table 224 produces a signal representing D(Z)·(1−A(Z)) on bus 242. The multipliers and the summer thereby produce the signal Y(k) on bus 244, which signal is also returned to memory 226.

It is important to note that the four examples given above are neither exhaustive nor mutually exclusive. For example, with reference to the embodiment shown in FIG. 10, lookup table 190 could produce an output Z that was any desired function of X(k) and Y(k−1), not just the absolute value of their difference as specified in the third and fourth examples. An illustration of this variation is a filter in which Z is defined to be the absolute value of the difference between X(k) and X(k−1). An illustration of a combination of features from the four listed examples is a filter in which for values of Z below a threshold, the filter of Equations (11)–(13) and FIGS. 9–10 is used, whereas for Z above the threshold, the filter coefficients are calculated as separate functions of X(k) and Y(k−1), as in Equations (9) and (10) and FIGS. 7A, 7B and 8. In another variation, an analytic function is used to determine the filter coefficients as a function of X(k), Y(k−1), etc. and the filter comprises a processor for computing the filter coefficients, instead of determining the coefficients from lookup tables.

While the preferred embodiments of the invention have been illustrated and described, variations will be apparent to those skilled in the art. Accordingly, the invention is not limited to the specific embodiments described, but is to be determined by reference to the following claims.

The embodiments of the invention in which an exclusive property or privilege is claimed are defined as follows:

1. In a medical ultrasound imaging system for producing a two-dimensional image of a subject, the imaging system including means for producing a plurality of pixel signals, each pixel signal comprising a time series of pixel values X(k), each pixel value being a function of the magnitude of an echo received from the subject at a particular sample volume, the improvement comprising:

adaptive temporal filter means for filtering each pixel signal to produce a filtered signal comprising a time series of filtered values Y(k), such that for each pixel signal, the characteristic of the filter means varies as the magnitude of the pixel signal varies, each filtered value Y(k) being determined by computing a weighted sum that includes the terms P·X(k) and Q·Y(k−1), P and Q being coefficients and Y(k−1) being the prior filtered value, at least one coefficient being a function of Y(k−1).

2. The improvement of claim 1, wherein the filter means has a low pass filter characteristic for each pixel signal.

3. The improvement of claim 2, wherein the low pass filter characteristic has a cutoff frequency that increases as the magnitude of the pixel signal increases, whereby for each pixel signal, a degree of averaging produced by the filter means decreases as the magnitude of the pixel signal increases.

4. The improvement of claim 3, wherein the cutoff frequency increases as the magnitude of the filtered signal increases.

5. The improvement of claim 1, wherein at least one coefficient is a function of pixel value X(k).

6. The improvement of claim 1, wherein for a given magnitude of X(k), coefficient Q decreases as Y(k−1) increases.

7. The improvement of claim 6, wherein for a given magnitude of Y(k−1), coefficient Q decreases as X(k) increases.

8. The improvement of claim 7, wherein coefficient Q is equal to B(1−A), where B is a monotonically decreasing function of Y(k−1) and A is a function only of X(k).

9. The improvement of claim 8, wherein B is substantially equal to one for small magnitudes of Y(k−1), and is substantially equal to zero for large magnitudes of Y(k−1).

10. The improvement of claim 8, wherein A is a monotonically increasing function of X(k).

11. The improvement of claim 10, wherein P is equal to 1−Q.

12. The improvement of claim 11, wherein the weighted sum includes no further terms.

13. In a method for producing a two-dimensional image of a subject by means of medical ultrasound imaging system, the imaging system including means for producing a plurality of pixel signals, each pixel signal comprising a time series of pixel values X(k), each pixel value being a function of the magnitude of an echo received from the subject at a particular sample volume, the improvement comprising the step of:

adaptively filtering each pixel signal in time to produce a corresponding filtered signal comprising a time series of filtered values Y(k), such that for each pixel signal, the characteristic of the filtering varies at the magnitude of the pixel signal varies, each filtered value Y(k) being determined by computing a weighted sum that includes the terms P·X(k) and Q·Y(k−1), P and Q being coefficients and Y(k−1) being the prior filtered value, at least one coefficient being a function of Y(k−1).

14. The improvement of claim 13, wherein the filtering step has a low pass characteristic for each pixel signal.

15. The improvement of claim 14, wherein the cutoff frequency of the low pass filtering step increases as the magnitude of the pixel signal increases, whereby of each pixel signal, a degree of averaging produced by the filtering step decreases as the magnitude of the pixel signal increases.

16. The improvement of claim 13, wherein for a given magnitude of X(k), coefficient Q decreases as Y(k−1) increases.

17. The improvement of claim 16, wherein for a given magnitude of Y(k−1), coefficient Q decreases as X(k) increases.

18. The improvement of claim 17, wherein coefficient Q is equal to B(1−A), where B is a monotonically decreasing function of Y(k−1) and A is a function only of X(k).

19. The improvement of claim 18, wherein B is substantially equal to one for small magnitudes of Y(k−1), and is substantially equal to zero for large magnitudes of Y(k−1).

20. The improvement of claim 18, wherein A is a monotonically increasing function of X(k).

21. The improvement of claim 20, wherein P is equal to 1−Q.

22. The improvement of claim 21, wherein the weighted sum includes no further terms.

* * * * *